Sept. 18, 1962   H. J. LAUHOFF ETAL   3,054,676
PROCESS FOR PRODUCING A CEREAL ADJUNCT FOR USE IN BREWING
Filed Nov. 26, 1958   3 Sheets-Sheet 1
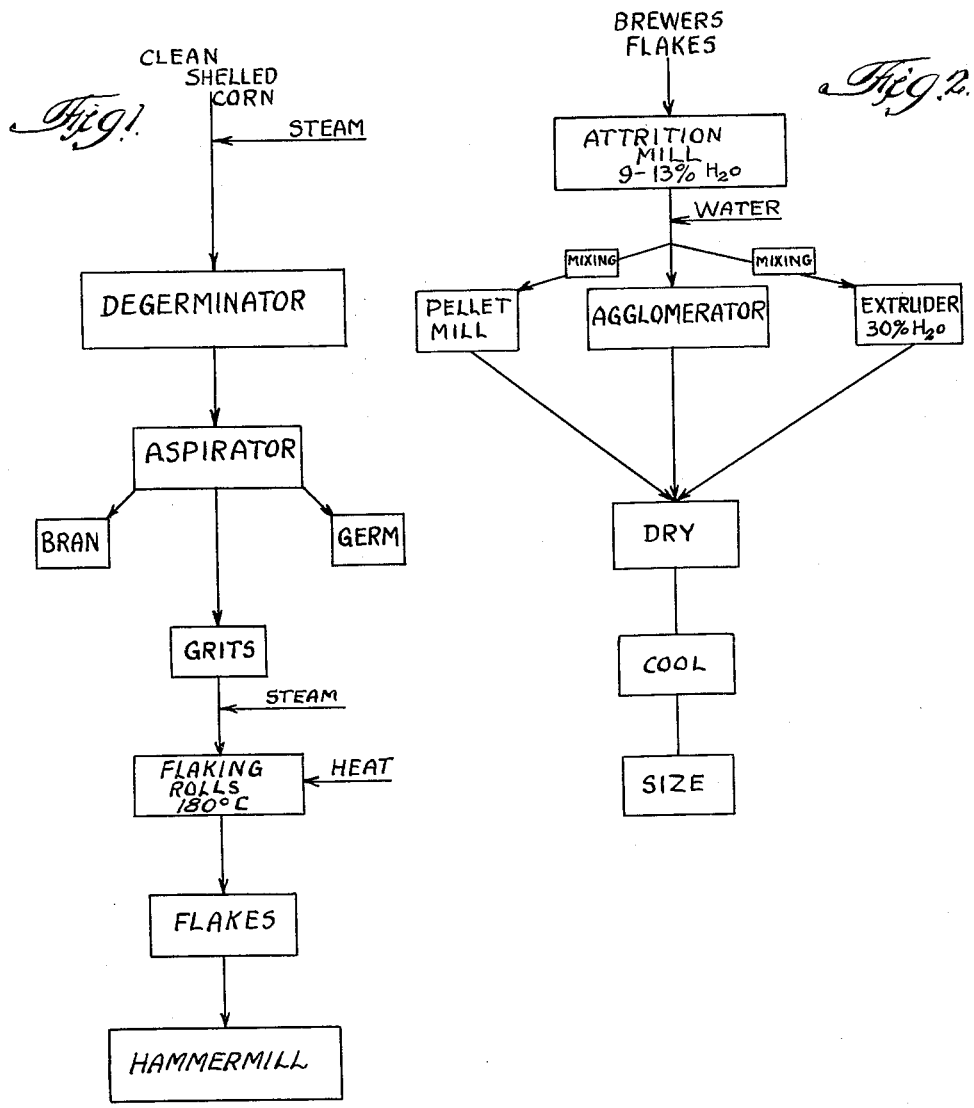

Sept. 18, 1962 H. J. LAUHOFF ETAL 3,054,676
PROCESS FOR PRODUCING A CEREAL ADJUNCT FOR USE IN BREWING
Filed Nov. 26, 1958 3 Sheets-Sheet 2
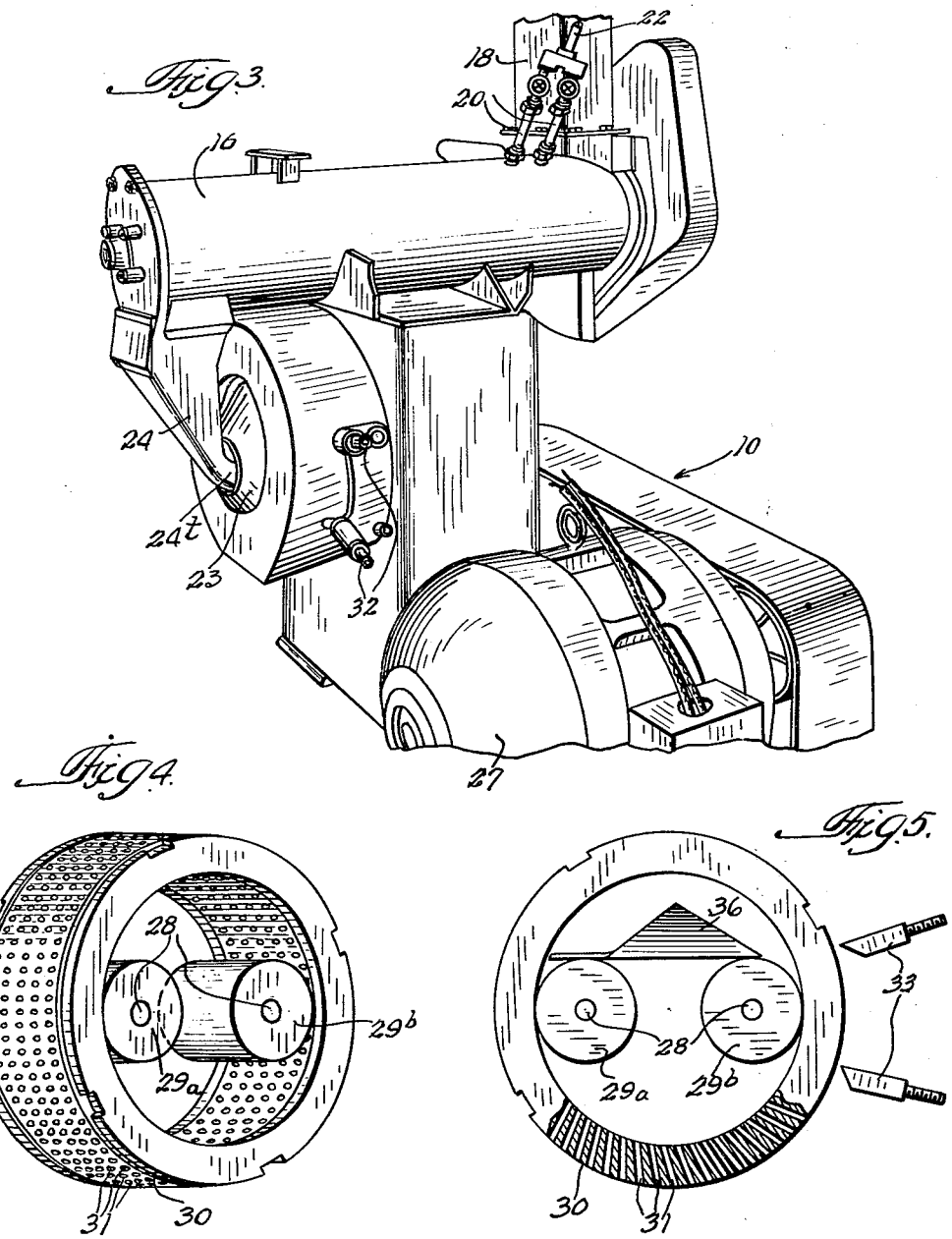
INVENTORS
Howard J. Lauhoff &
Albert J. Hardgrove
BY
Olson, Mecklenburger, von Holst,
Pendleton, & Newman. Attys.

Sept. 18, 1962 H. J. LAUHOFF ETAL 3,054,676
PROCESS FOR PRODUCING A CEREAL ADJUNCT FOR USE IN BREWING
Filed Nov. 26, 1958 3 Sheets-Sheet 3
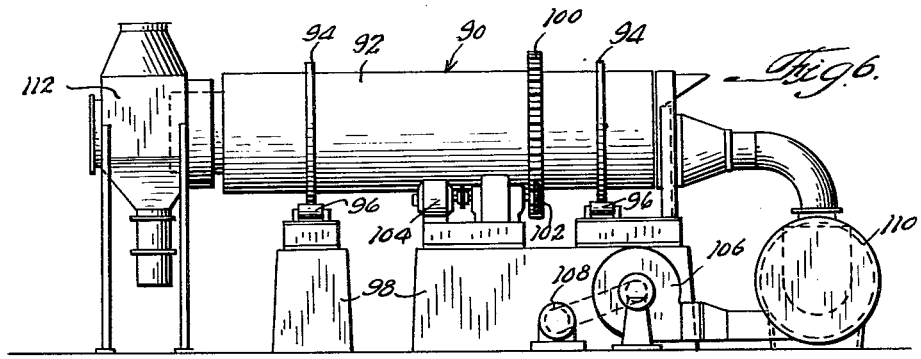
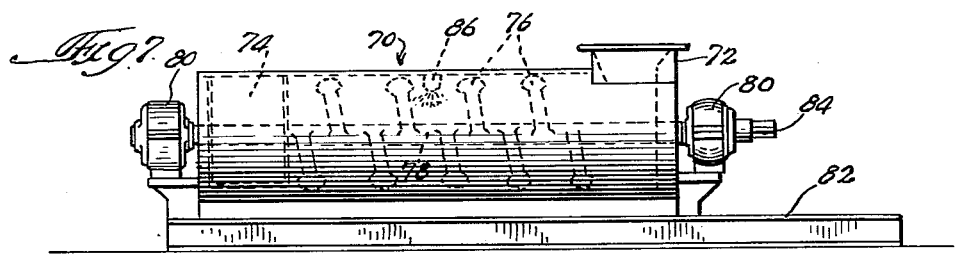
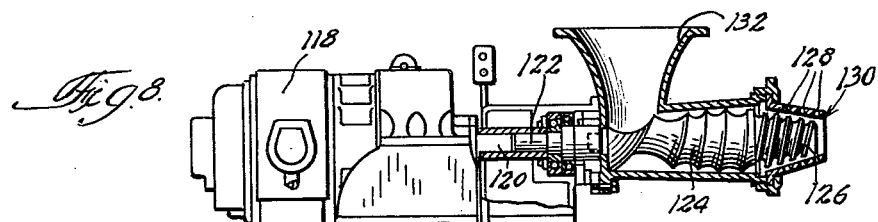
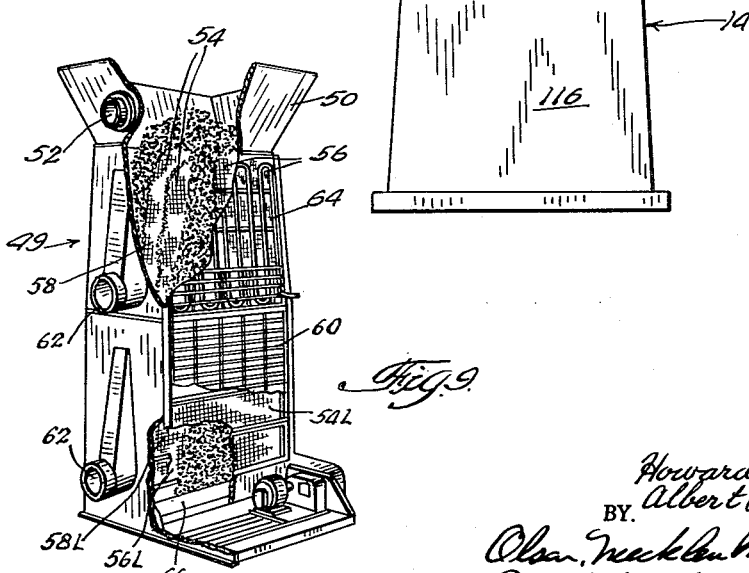
INVENTORS.
Howard J. Lauhoff &
BY Albert J. Hardgrove.

United States Patent Office 3,054,676
Patented Sept. 18, 1962

3,054,676
PROCESS FOR PRODUCING A CEREAL ADJUNCT FOR USE IN BREWING
Howard J. Lauhoff and Albert J. Hardgrove, Danville, Ill., assignors to Lauhoff Grain Company, Danville, Ill., a corporation of Illinois
Filed Nov. 26, 1958, Ser. No. 776,462
4 Claims. (Cl. 99—80)

This invention relates to improved cereal adjuncts and methods for making the same.

Cereal adjuncts, which are well known in the brewing art, may comprise the starchy fraction of a number of cereal grains. The starchy cereal fraction is extracted by mixing the same with malt and water under appropriate conditions of time and temperature during a mashing step. A resultant solution, called wort, is obtained by straining the mash to separate the liquid extract from the residue of spent grain; the wort is boiled with hops and cooled. Yeast is then added to the cooled wort, and the action of the yeast during subsequent fermentation produces a beer product.

Although a few all-malt beers are produced, the majority of brewers employ adjuncts to obtain beer having a desired pale color and one which is less filling while at the same time possessing a zesty flavor. Adjuncts also increase the stability of beer, particularly of bottled beer.

The starchy cereal adjuncts must be in a gelatinized state (transformed into a jelly-like consistency) during the mashing operation, thereby enabling certain enzymes, more particularly alpha and beta amylase, to saccharify or convert the starch into dextrins. During gelatinization protein cell walls surrounding starch masses are broken down enabling the enzymes to gain access to such masses. The dextrins formed are subsequently acted upon by brewers yeast during fermentation, contributing the desired above-mentioned properties to the beer product. The adjuncts are thus seen to play an important role in the brewing of beer.

Heretofore brewers have obtained the high starch cereal fraction either in the form of grits, or in the form of what is known in the art as brewers flakes. Grits are the uncooked, starchy portion of the cereal. The grits may be transformed into flakes through heat and pressure, which conditions gelatinize the starch.

To effect starch gelatinization prior to use in the mashing operation, grits require a cooking step and the attendant presence of cooking equipment at the brewery. Brewers flakes, while comprising pregelatinized starch, are difficult to handle because of their ready frangibility. A safety hazard resulting from the ready formation of dust and accompanying possibility of explosion is another problem encountered with the use of brewers flakes.

It is an object of this invention therefore to provide an improved cereal adjunct which can be efficiently handled and employed directly in the mashing step without pre-treatment. It is also an object of this invention to provide a method for producing such adjunct.

It is a further object of this invention to provide an improved cereal adjunct which will produce a higher product yield in the normal brewing operation.

It is another object of this invention to provide a cereal adjunct which can be efficiently utilized in any modern automatic brewery apparatus designed to handle materials necessary in the brewing process.

It is another object of this invention to provide an improved pregelatinized cereal adjunct for breweries which has less bulk than other similar type adjuncts, thereby reducing shipping costs, and requiring less storage space.

It is another object of this invention to provide an improved cereal adjunct which may be readily produced in different sizes to meet the varied requirements of the brewing industry.

The cereal starch of this invention may serve another important function. Ordinary corn meal and corn grits found in the kitchen for use in the preparation of muffins, mush, and other well known food items, require immersion in a hot liquid for a sufficient length of time to enable the protein cell walls surrounding the starch fraction to be broken down. The cell wall breakdown enables the starchy portion to be subjected to action by the body enzymes and the food values contained therein assimilated by the body of the person ingesting the same.

It is a further object of this invention, therefore, to provide corn cereal forms having the physical appearance of corn meal or corn grits which requires no cooking or boiling in the course of preparing edible items normally made from ordinary corn meal and corn grits.

It is another object of this invention to provide a corn cereal form for human consumption which absorbs cold liquids while having the same taste and physical appearance as well known corn grits and meal requiring cooking prior to ingestion.

The above and other objects of this invention will become more apparent from the following detailed description and appended claims.

In one embodiment of the provided invention a cereal, such as corn kernels, is dry-milled and the starchy fraction thereof recovered following aspirating and other separation steps whereby the oily germ and bran are separated therefrom. The starch fragments of the milled corn are then heated and moisturized by means of steam which adds about 4% moisture thereto.

The starch particles are next converted into large flakes by passing the same between heated flaking rolls. The starch is gelatinized in the course of flake formation because of the heat and pressure, and the formed flakes are reduced in size. The reduced flakes are moisturized by water until the total moisture content is approximately 16 to 25%. The resulting moisturized product is then forced through a perforated die means under controlled heat and pressure conditions, care being taken to generate no excess heat during passage. The product is then sized and the particles thereof may be further divided if desired. The resulting pregelatinized starch masses are then dried into pellet-like articles which may be used in the mashing step in brewing operations without any preliminary processing.

The extruded product, if made from corn, may be reduced in size still further to the physical size of corn meal or corn grits and employed as an "instant" corn preparation as will hereinafter be explained in greater detail.

For a better understanding of this invention reference should now be made to the drawing wherein:

FIGURE 1 is a flow sheet of a method for forming brewers grits;

FIG. 2 is a flow sheet of a method using any of three alternative steps for forming the cereal products of this invention;

FIG. 3 is a fragmentary perspective view of one type of apparatus which may be employed in making one form of the cereal products of this invention;

FIG. 4 is a perspective view of a die and cooperating roller members of the apparatus of FIG. 3;

FIG. 5 is a front elevational view partly in section of the members of FIG. 4 illustrating a deflector member in place and the die partly in section;

FIG. 6 is a side elevational view of a drier which may be employed for drying one form of the cereal products of this invention;

FIG. 7 is a side elevational view of a mixing apparatus which may be employed in manufacturing one form of the cereal products of this invention;

FIG. 8 is a side elevational view partly in section of an extrusion apparatus which may be employed in manufacturing one form of the cereal products of this invention; and FIG. 9 is a perspective view partly broken away illustrating a combination cooler-dryer which may be employed in processing one form of the cereal products of this invention.

For a better understanding of the provided invention the following detailed description is given. It should be understood at the outset that while this particular description relates to an adjunct formed from corn, the process steps and adjunct product may be conducted with and formed from the starchy fraction of other cereals such as rice, wheat, milo, kafir, et cetera. Although certain process steps may be slightly altered to accommodate the physical characteristics of a specific cereal, it is believed that the provided process is sufficient to teach one skilled in the art the means whereby an improved adjunct for use in brewing beer may be obtained without the exercise of invention over and above that hereinafter disclosed.

Starch Recovery—Brewers Grits

Shelled corn (which comprises the particular cereal in the process hereinafter described) is cleaned and moisturized with live steam to soften the hard exterior surface or hull portion. This moisturizing step comprises a preliminary treatment before conveying the corn to a mill, commonly known as a degerminator. There the corn kernel is broken down into its various components, usually by means of a rapidly revolving, abrading cone inside a perforated cone through which the germ, or oily portion of the corn kernel, and fine starchy portions pass after being separated from the larger kernel portions that pass through the end of the cone. The larger kernel portions constitute what is known in the art as grits, and contain the starchy low protein portion of the corn kernel.

The relatively large-particle grits or high starch fraction of the dry milled corn were heretofore purchased by some brewers for use in brewing operations. However, as it is necessary to convert the hard grits into a state wherein the starch may be readily acted upon by the enzymes in the mashing step, enabling the starch to be converted to dextrins, it is necessary that brewers gelatinize the starch at the brewery. In the gelatinization process protein cell walls, impenetrable by enzymes and surrounding the starch masses, are broken down by cooking. This step requires large cooking vessels, constituting an expense not only in equipment but also in processing time. Following gelatinization of the starch content of the grits they are ready for use in the mashing step.

To dispense with the need for cooking grits at the brewery, a product known in the trade as brewers flakes is employed wherein the starch content has been pregelatinized.

Brewers Flakes

Brewers flakes are formed by moisturizing grits which may vary in size from between about 4 and 40 mesh. A live steam treatment softens the grits prior to passing them between flaking rolls which are heated rolls having a temperature of between about 200° and 600° F. that rotate rapidly in opposite directions and exert tremendous pressure on the grits as they pass therebetween. The heated rolls flatten the grit particles into flakes while the starch cells are concomitantly gelatinized. The formed flakes are conveyed, usually by air, to a flake cutter where they are reduced to a size within the general range of about ¼ to 1 inch in diameter.

The processing thus far disclosed is known in the art, as are the two adjunct forms commonly called grits and brewer flakes.

The disadvantages of grits are obvious. They necessitate a separate cooking step at the brewery and require extra processing time as well as a large expenditure for processing equipment.

Brewers flakes eliminate the cooking step required with grits so that the flakes, comprising pregelatinized starch, may be employed directly in the mashing step.

The physical properties of brewers flakes are somewhat similar to the well known breakfast food cereal flakes in that they are readily frangible and, when used in the brewery, create a dust problem that at times may constitute a safety hazard. Furthermore, their ready frangibility renders them difficult to handle in much of the handling apparatus commonly used in a brewery.

The presence of very fine flake particles or flour is undesired in many breweries in the mashing operation, but it is oftentimes difficult to retain the flakes in their original form. It is apparent that their low density creates shipping and storage problems since considerable low density bulk is involved, leading to high transportation costs and necessitating the use of considerable storage space in the brewery.

In accordance with this invention it has been found that a cereal adjunct of pregelatinized starch may be provided in a readily handled form, eliminating the difficulties encountered with brewers flakes. The new adjunct product also reduces shipping costs and requires less storage space.

New Form of Cereal Adjunct

The new form of cereal adjunct is processed from brewers flakes which may be used as a starting material. Although brewers flakes are generally about ¼ to 1 inch in diameter, for purposes of this invention the flakes produced by the flaking rolls from the grits are transferred directly to a hammer mill. There the flake size is reduced by grinding through a ¼ to ⅛ inch screen.

In the smaller particle form the flakes may be processed in various types of equipment known in several arts. For instance the ground flakes may be formed into a compact agglomerated mass, which is the new form of adjunct provided by this invention, either by means of well known pelleting apparatus or by a mixer or agglomerator commonly used in the fertilizer industry. In addition the new compact form of the provided adjunct may be made by means of a common type apparatus such as is well known in the food industry.

Pelleting Procedure

Pelleting apparatus well known in the art may be employed in the course of making one form of the cereal adjunct provided after certain modifications. Such an apparatus identified by the numeral 10 is illustrated in FIG. 3. In the normal course of using the apparatus 10, ground brewers flakes containing pregelatinized starch enter mixing chamber portion 16 of the apparatus 10 by means of chute portion 18 (fragmentarily shown in FIG. 3). The chute is in communication with a source of said flakes, which may comprise a hammer mill where the flakes are reduced in size. Water is injected into the mixing chamber 16 until the total moisture content of the flakes is increased from within the range of about 9 to 13% to within the range of about 16 to 25% by weight. The water is sprayed into the chamber 16 by means of inlets 20 after first flowing through a regulating valve 22 which governs the flow of water from a source not illustrated. The flakes are intimately mixed with the water in the course of spraying by agitators (not illustrated) in the mixing chamber which assure the formation of a uniformly moisturized product.

The moisturized flake product is discharged from one end of the mixing chamber 16 into an underlying die chamber by means of a connecting chute 24. A rotating die 30 is more clearly illustrated in FIGS. 4 and 5, and is seen to comprise a cylindrical member having a plurality of apertures 31 of substantially uniform diameter (unlike tapered apertures usually found in apparatus of this type) disposed therethrough, which are nonradially arranged relative to the die axis of rotation. The nonradial arrangement of the die apertures enables the full thrust of smooth-surfaced roller members 29a and 29b to be exerted upon the moisturized flake product which enters the bite of the two rollers in the process of being extruded through the die apertures 31. As will be noted from FIG. 3, the terminal end 24t of chute 24 is disposd inside a conical member 23 which is detachably secured to the periphery of the die 30 and which defines a rotating die chamber therewith.

In the normal extruding operation moisturized pregelatinized flakes are deposited on an inner surface portion of the rotating cone 23 which, together with die 30, is rotatably driven by illustrated motor 27 in FIG. 3. The deposited moisturized flakes are carried by the rotating cone into the bite of roller 29a which tangentially engages the inner surface of the rotating die 30, and together with roller 29b is forced by such engagement to rotate about their fixed axes 28. It is thus seen that the die 30 and cone 23 are positively driven, by motor 27, whereas roller members 29a and 29b rotate because of their engagement with the inner peripheral surface of die 30. That portion of the moisturized flakes fed into the die chamber which is not extruded by roller 29a through die apertures 31 is carried by rotating cone 23 into the bite of roller 29b whereby the moisturized flake product may be forced by the latter roller through nonradial die openings 31. Deflector 36 illustrated in FIG. 5 assists in directing the flakes to be extruded into the bite of the second roller 29b.

In order to form an extruded product of desired particle size, stationary knives such as knives 33 (illustratd in FIG. 5) are disposed adjacent the exterior die periphery and serve to cut the extruded product into fragments of desired size.

In the course of being forced through the die apertures, heat is generated. The moisture content of the flakes is important as it regulates the consistency of the moisturized flake mass and governs the friction effected between the the extruded product and the die aperture-defining portions. If too much moisture is used, approximately 26% or higher, the product will "ball" about the rollers and will not pass into the bite of the rollers. If there is too little moisture, the excessive friction generated by extrusion creates such heat that the product is plasticized and plugs up the die apertures, thus stopping the extrusion process. The minimum moisture content of the flakes should not fall below approximately 15%; the optimum temperature for extrusion is in the neighborhood of about 140° F. The extrusion temperature should not exceed about 150° F.

The extruded agglomerate is then dried to remove excess moisture in the product which moisture was necessary to conduct the extrusion operation. The final pellet-like product has a moisture content of between 2 and 20%.

*Extruded Pellet-Cooling Device*

The apparatus employed to dry and cool the extruded product may be similar to conventional equipment used in the manufacture of pellets. In FIG. 9 a pellet drier-cooler 49 is illustrated having an upper hopper portion 50 into which hot extruded particles from an apparatus (such as apparatus 10 of FIG. 3) may be discharged. The numeral 52 identifies a bin level indicator. Inner screen portions 54 which taper to an edge in the upper portion of the drier-cooler cooperate with outer screens 56 (only one of which is seen in FIG. 9) in the formation of opposed pellet holding chambers between which is disposed a triangular air space 58. Screen sections 54L and 56L are in parallel relationship and define opposed rectangular pellet-receiving chambers in the lower portion of the illustrated unit and have rectangular air space 58L disposed therebetween. The central air spaces 58 and 58L are in communication with a suction blower (not illustrated) by means of unit outlets 62 whereby air may be drawn through louvers 60 and the foraminous screens 54 and 56, and 54L and 56L into the air spaces 58 and 58L. The upper screens 56 have steam coils 64 disposed on the outer surfaces thereof whereby the particles may be initially dried in the course of cooling.

The moist hot particles discharged into hopper 50 of drier-cooler 49 gravitate to the bottom in the course of drying and cooling and are discharged from the lower portion thereof by means of a revolving paddle discharge gate 66. The gate may discharge the dried cooled particles onto a conveying belt or equivalent means for removal from the vicinity of the unit 49. The product may then be sized by running over a combination of screens and sizing rollers such as are used in any cereal milling process.

A working example of a pelleting operation whereby the agglomerated adjunct of this invention is formed is as follows:

A small master model California pellet mill driven by a 30 H.P. motor was employed, providing a die speed of 128 r.p.m. A high speed mixing chamber rotating at 800 r.p.m. was also utilized in conjunction with the die. Ground brewers flakes formed in the manner previously described were jet sprayed with water at a pressure of 50 pounds per square inch through spray nozzles. Water delivered through the nozzles was metered to assure required moisture being added to the ground flakes. On reaching a moisture content of 20 to 21% by weight, the flakes were dumped through a feed chute into the revolving die chamber. The rotation of the die feed cone carried the moisturized flake product into the bite of the first lead roller, forcing it through the die apertures. The die had a thickness of about 3/4 inch and the die apertures were about 1/4 inch in diameter. Any material then remaining on the feed cone was deflected by the deflector blade so it passed into the bite of the second or back roller.

Two stationary knives were adjusted to cut the extruded product from the outside edge of the revolving die into desired size.

*The Agglomeration Method*

The novel adjuncts of this invention may also be formed by employing mixing or agglomerating apparatus commonly employed in the fertilizer industry in accordance with the following procedure:

Ground brewers flakes are placed in a high speed mixer such as a Robinson high speed mixer, rotating about 900 r.p.m. if employing a single agitator, or about 600 r.p.m. if employing a double agitator. A single agitator mixer 70 is illustrated in FIG. 7. Flakes enter the mixer at one end by means of hopper 72 and are discharged from the opposed end portion through product discharge opening 74. Mixing is effected by agitator arms 76 on shaft 78 which is mounted at opposed end portions in bearings 80. Shaft 78 may be driven by a motor (not illustrated) or equivalent means which may be mounted on base 82 and engage shaft end 84. Water may enter the mixer interior by spray means 86 which is in communication with a water source (not illustrated). The flakes are sprayed with water until the total moisture content of the flakes, based on their weight, is between about 30 to 40%. The specified water content enables the mixed or agitated flake composition to form into heterogeneous agglomerates of desired size. Certain brewers, for example, desire an agglomerate size within the range of between about 6 and 20 mesh; however, the sizes formed by this method are of course not limited to such range.

The highly moisturized agglomerates formed are removed from the mixer 70 and then dried and cooled by means of a slow drying-type apparatus such as a Proctor-Schwartz belt drier, or a slowly revolving drum-type drier such as drier 90 illustrated in FIG. 6. Drier 90 is of a well known type and comprises a shell 92 supported by steel tires 94 secured to peripheral portions of the shell which rest on roller bearings 96 mounted on supports 98. Drier shell 92 is driven by gear 100 secured to the periphery thereof. The latter gear is driven by pinion 102 which is in turn driven by motor 104. Blower 106, driven by motor 108, forces air through furnace 110 and into the shell. The product is driven to collecting hopper 112 from which the product may be removed as desired. The discharge end of shell 92 should be slightly lower than the opposed end of the shell to facilitate product movement. Since dust is generally formed in the normal drying process, hopper 112 may be in communication with a dust trap (not illustrated).

Cooling may subsequently be effected by any conventional type cooler. The final product may be sized and preferably has a moisture content within the range of 2 to 20%.

Extruder Apparatus

The following relates to a method for forming the novel products of this invention using a well known type of extrusion apparatus:

Ground brewers flakes are moisturized in a mixing chamber until a moisture content of 25 to 35% by weight is reached. The moisturized flake mass is discharged into the hopper of a screw-type press extruder. The extruder may be any of a well known type employed in the chopping of meats and other food products wherein the material is forced by means of a worm or screw through replaceable stationary cones or plates containing apertures of desired size. For purposes of this invention an apertured conical die plate is suitable. Following the extrusion operation the product is dried to remove excess moisture and cooled, and may be sized in accordance with any well known manner. The final moisture content should be between 2 and 20% by weight.

FIG. 8 illustrates one form of well known extrusion apparatus 14 which comprises a base 116 on which a motor 118 is supported. Motor 118 rotatably drives shaft 120, thereby driving socket shaft 122 to which is attached feed screw 124. A cutter 126 is attached to screw 124, and forces the moisturized flakes through apertures 128 of die cone 130 which may have a size of about 3/16 inch in diameter. The moisturized flakes to be extruded engage feed screw 124 by being deposited in conical feed opening 132.

The novel form of the pregelatinized cereal starch produced by means of well known apparatus in the manners above described may be directly employed in the mashing step in the brewery for conversion into dextrins preliminary to the fermentation step in the normal course of brewing. Following the cooling and drying steps the agglomerates are coherent masses of greater compactness than brewers flakes and are not readily frangible.

The novel cereal particles are cheaper to ship and require less storage space, which is often at a premium in a brewery; they create no dust problem, as do brewers flakes. The coherent agglomerates described may be readily processed in any apparatus commonly used in breweries for feeding or measuring operations without creating the problems oftentimes encountered with brewers flakes.

Also, it has been found that the product yield from the adjuncts of this invention is consistently higher by approximately 2% than that obtainable with either brewers grits or brewers flakes. While the reason for this higher yield is not known, it is theorized that the heat generated in comminuting the flakes may effect a liberation of starch not possible when brewers grits or flakes are processed in the manners well known in the art.

Because of the large quantities of adjunct used in brewing operations, the saving to be effected by the additional 2% yield would be substantial. It is seen, therefore, that the adjunct of this invention, in addition to providing handling advantages, also possesses other valuable advantages not found in adjuncts such as grits and flakes.

Moisture Variance

It has been seen that the moisture content of the flake mass being processed varies with the apparatus employed. The agglomerators employ a mass of pregelatinized cereal flakes in which the moisture content of 30 to 40% by weight enables desired formation of the agglomerates or balling to take place. Utilizing the pelleting apparatus above described, the moisture content is less inasmuch as great pressures effected by the rolls are available in forcing the moisturized flakes through the die openings. Care must be taken to have sufficient mass fluidity so that the masses in the process of being forced through the die are not overheated resulting in starch breakdown accompanied by fluidizing of the pregelatinized starch and clogging of the die apertures. In the extrusion process employing the illustrated extruder, greater flake fluidity than in the pelleting apparatus is necessary, and accordingly more moisture in the flakes is necessary to enable the same to pass through the extruder die apertures. The moisture content of the flakes is thus seen to be determined by the ability of the particular apparatus to form agglomerated masses of the moisturized flakes without causing starch deterioration.

Instant Corn Meal and Grit Preparations

The agglomerated gelatinized masses produced from corn in accordance with the above description may also be employed for direct human consumption.

Corn meal and corn grits are similar to brewers grits and comprise high starch portions of the corn kernel in which the individual starch cells or masses are surrounded or enclosed within a protein cell wall. Before the body enzymes are able to perform their function of digestion-aiding catalysts, the protein walls must be broken down to allow enzyme access to the starch. The cell wall breakdown is accomplished by heat in the course of a cooking operation. In such cooking operation the starch is gelatinized and transformed into a form upon which the body enzymes may readily act.

The above-described pregelatinized agglomerated masses formed for purposes of serving as brewing adjuncts may be reduced to the particle size of corn grits and meal and serve as instant grits or meal, depending upon particle size, the range of 40–20 mesh defining grits and 20–60 defining meal. Since corn grits and meal are formed from the same kernel portion as the brewing adjuncts, and since the starch masses are pregelatinized and water soluble, no cooking is necessary for purposes of breaking down the protein cell walls surrounding the starch masses. The grits and meal formed from the previously described pregelatinized cornstarch may thus be readily prepared into edible preparations, such as mush, without cooking. The resulting food preparations will have the same taste and will be as readily digested as corn grits or meal which have the starch therein gelatinized by cooking in the course of food preparation. The "instant" corn grit and meal preparations may be fortified with vitamins and other desirable additives in a manner well known in the food arts.

As stated above, it is intended that this invention cover processing of all cereal starches for forming brewing adjuncts. It is also obvious that certain changes may be made which still enable the resulting process or product to remain within the ambit and scope of the appended claims. In the claims following, the word "agglomerated" when employed in describing the product claimed is used in its basic meaning referring to a collected ball or mass and does not relate solely to adjunct forms made by employing any specific apparatus above described.

This invention, therefore, is to be limited only by the following claims.

We claim:
1. A process for producing a cereal adjunct for use in brewing from brewers flakes, comprising the steps of comminuting said brewers flakes by grinding through a ¼ to ⅛ inch screen, adding sufficient moisture to said brewers flakes to increase the moisture content thereof to 16 to 40% by weight, forming said moisturized comminuted flakes into form-retaining agglomerates, and reducing the moisture content of said agglomerates to 2 to 20% by weight.

2. The process of claim 1 in which said agglomerates are formed by increasing the moisture of the comminuted brewers flakes to 16 to 25% by weight, intimately mixing said moisturized flakes and forcing the mixed flakes through die apertures at a temperature of 140° to 150° F.

3. The process of claim 1 in which the agglomerates are formed by increasing the moisture content of the comminuted brewers flakes to 30 to 40% by weight, and rapidly rotating the moisturized flakes to form heterogeneous agglomerates.

4. The process of claim 1 in which the agglomerates are formed by increasing the moisture content of the comminuted brewers flakes to 25 to 35% by weight, intimately mixing said moisturized flakes and extruding said moisturized flakes into agglomerates of desired size.

References Cited in the file of this patent

UNITED STATES PATENTS

| | | |
|---|---|---|
| 304,722 | Gent | Sept. 9, 1884 |
| 312,265 | Gent | Feb. 17, 1885 |
| 558,393 | Kellogg | Apr. 14, 1896 |
| 634,003 | Kellogg | Oct. 3, 1899 |
| 903,586 | Lauhoff | Nov. 10, 1908 |
| 1,035,836 | Anderson | Aug. 20, 1912 |
| 1,155,977 | Vernon | Oct. 5, 1915 |
| 2,060,408 | Wood | Nov. 10, 1936 |

FOREIGN PATENTS

| | | |
|---|---|---|
| 5,132 | Great Britain | of 1878 |
| 5,318 | Great Britain | of 1898 |
| 492,534 | Great Britain | Sept. 22, 1938 |